United States Patent
Sijbers et al.

(10) Patent No.: US 12,500,062 B2
(45) Date of Patent: Dec. 16, 2025

(54) RECONSTRUCTION METHOD FOR ATOM PROBE TOMOGRAPHY

(71) Applicants: UNIVERSITEIT ANTWERPEN, Antwerp (BE); IMEC VZW, Leuven (BE)

(72) Inventors: Jan Sijbers, Duffel (BE); Jan De Beenhouwer, Geraardsbergen (BE); Yu-Ting Ling, Antwerp (BE); Wilfried Vandervorst, Leuven (BE)

(73) Assignees: UNIVERSITEIT ANTWERPEN, Antwerp (BE); IMEC VZW, Leuven (BE)

( * ) Notice: Subject to any disclaimer, the term of this patent is extended or adjusted under 35 U.S.C. 154(b) by 542 days.

(21) Appl. No.: 18/017,575

(22) PCT Filed: Jul. 9, 2021

(86) PCT No.: PCT/EP2021/069197
§ 371 (c)(1),
(2) Date: Jan. 23, 2023

(87) PCT Pub. No.: WO2022/022993
PCT Pub. Date: Feb. 3, 2022

(65) Prior Publication Data
US 2023/0307207 A1 Sep. 28, 2023

(30) Foreign Application Priority Data
Jul. 27, 2020 (EP) .................................... 20188015

(51) Int. Cl.
*H01J 37/26* (2006.01)
*G01N 23/04* (2018.01)
*G01N 23/046* (2018.01)

(52) U.S. Cl.
CPC ............ *H01J 37/26* (2013.01); *G01N 23/046* (2013.01); *G01N 2223/401* (2013.01)

(58) Field of Classification Search
CPC .. H01J 37/26; G01N 23/046; G01N 2223/401
See application file for complete search history.

(56) References Cited

U.S. PATENT DOCUMENTS

| 9,412,558 | B2 * | 8/2016 | Van Dyck ............... H01J 37/06 |
| 11,043,369 | B2 | 6/2021 | Kuramoto et al. |
| 2019/0277881 | A1 | 9/2019 | Paredis et al. |

(Continued)

FOREIGN PATENT DOCUMENTS

| EP | 3537161 A1 | 9/2019 |
| JP | 2019158521 A | 9/2019 |

OTHER PUBLICATIONS

Japanese Office Action from Corresponding Japanese Patent Application No. JP2023-505684, May 13, 2025.

(Continued)

*Primary Examiner* — Sean M Luck
(74) *Attorney, Agent, or Firm* — Workman Nydegger

(57) ABSTRACT

A method for determining a three-dimensional atomic distribution of a sample having a tip, during an atom probe tomography process. The method accounts for the tip not being axial symmetric and not having a hemispherical shaped apex throughout the evaporation process.

15 Claims, 7 Drawing Sheets

(56) References Cited

U.S. PATENT DOCUMENTS

2019/0318907 A1  10/2019  Gorman

OTHER PUBLICATIONS

International Search Report from PCT Application No. PCT/EP2021/069197, Sep. 21, 2021.
Search Report from European Application No. 20188015.0, Mar. 9, 2021.
Beinke et al., "Towards an Accurate Volume Reconstruction in Atom Probe Tomography," Ultramicroscopy, Elsevier, vol. 165, Mar. 28, 2016, 8 pages.
Beinke et al., "Extracting the Shape of Nanometric Field Emitters," Nanoscale, vol. 12, No. 4, Jan. 30, 2020, 13 pages.
Beinke et al., "Atom Probe Reconstruction with a Locally Varying Emitter Shape," Microscopy and Microanalysis, vol. 25, No. 2, Oct. 10, 2019, 8 pages.

* cited by examiner

ID FOR ATOM
RECONSTRUCTION METHOD FOR ATOM PROBE TOMOGRAPHY

TECHNICAL FIELD

The present invention relates to the field of atom probe tomography. In particular the present invention relates to determining a three-dimensional atomic distribution of a sample within a field of view of an instrument.

Background Art

Atom probe tomography (APT or 3D Atom Probe) is a nanoscopic material analysis technique that enables three-dimensional atomic-scale imaging, as well as determining the chemical composition of materials at an atomic scale and sub-nanometre spatial resolution. In this technique, a sample is sharpened towards a hemispherical shape with an end radius less than 50 nm. The sharpened specimen is placed into a vacuum chamber and aligned to the centre of an ion detector while a high voltage bias is applied between the tip and the detector. A high electric field (>10 V/nm) is thereby induced at the apex of the tip such that the atoms at the surface of the apex are ionized and close to the threshold of evaporation. In many cases, a laser pulse is added to trigger the evaporation process by supplying additional thermal energy such that the atoms at the apex can overcome the energy barrier of evaporation. Evaporated ions are detached from the tip surface and are accelerated towards the detector according to the electric field distribution between the tip and the detector. The impact position on the detector and the time-of-flight (TOF) are measured. The TOF is measured as the time difference between the arrival time (on the detector) and the onset of a voltage pulse or laser pulse which triggers the evaporation process. By analyzing the time of flight of the atoms, the mass-to-charge ratio of the species can be determined. Based on the positions where the ions hit the detector and the evaporation sequence number, one can design reconstruction algorithms to transform the raw data into a three-dimensional atomic distribution of the sample. Various approaches for such a reconstruction exist, some of which are commercially implemented. In many cases, an important (simplifying) assumption is made by assuming that the tip is axial symmetric and has a hemispherical shaped apex with a straight approximation to its flight trajectory. In the case of heterogeneous samples and/or laser-based evaporation the tip shape can differ substantially from such an idealized shape (varying curvature, non-symmetrical shape), leading to inaccurate reconstruction. Obviously, improved accuracy can only be achieved by employing algorithms incorporating the detailed tip shape. The most challenging part of the reconstruction is to dispose of methods to depict the evolving tip shape quantitatively during the evaporation, with high precision and accuracy.

The publication "Atom Probe Reconstruction With a Locally Varying Emitter Shape" by D. Beinke and G. Schmitz in Microscopy and Microanalysis, volume 25, special issue 2, pages 280-287, of the year 2019, discloses an improved method for atom probe tomography. The method allows the variations of surface curvature of a tip which however does not resolve the issue of the non-symmetric tip. The publication "Extracting the shape of nanometric field emitters" by D. Beinke et al. in Nanoscale, Volume 12, issue 4, pages 2820-2832, of the year 2020, proposes a solution to derive the non-symmetrical tip shape. The method is demonstrated to be able to estimate an evaporated tip shape by the simulation but has, however, not been examined in a real tip surface. Also, the method requires the extrapolation of the curvature of the non-detected region on a tip surface (i.e. outside FOV) which may increase the error during the estimation.

European patent application EP3537161A1 discloses a method for imaging the tip shape using scanning probe microscopy.

SUMMARY OF INVENTION

It is an object of embodiments of the present invention to provide a good method for determining a three-dimensional atomic distribution of a sample during an atom probe tomography process.

The above objective is accomplished by a method and device in accordance with the present invention.

In a first aspect, the present invention provides a method for determining a three-dimensional atomic distribution of a tip-shaped sample, hence a sample having a tip, during an atom probe tomography process. The method comprises:
 (i) Carrying out an evaporation process, comprising evaporating atoms from the sample and projecting them onto a detector where they are detected, the detected atoms comprising reference atoms and target atoms,
 (ii) Recording a hit map belonging to a predetermined stage of the evaporation process, comprising hit locations of each detected atom on the detector, and a time of flight of each detected atom,
 (iii) Dividing the hit map in a plurality of zones,
 (iv) Selecting the detected atoms in a zone of the hit map,
 (v) Based on the recorded time of flight of the reference atoms, identifying the mass-to-charge ratio of the target atoms, by comparison of the recorded time of flight of the reference atom,
 (vi) Repeating steps (iv) to (v) for all zones of the hit map for building a mass-to-charge spectrum,
 (vii) Deriving a flight length of selected atoms of an arbitrary element in a peak of the mass-to-charge spectrum,
 (viii) Deriving a launch angle of the selected atoms,
 (ix) Based on the derived launch angles of the selected atoms, estimating an approximate surface geometry of the tip in a first field of view region of the sample,
 (x) Measuring an actual surface geometry of the tip of the sample,
 (xi) Matching the approximate surface geometry to the actual surface geometry, and
 (xii) Deriving size and position of a first field of view region for the detected atoms based on the approximate surface geometry matched to the actual surface geometry,
 (xiii) Recording a hit map belonging to another predetermined stage of the evaporation process and repeating steps (iii) to (xi), and deriving size and position of a second field of view region for the detected atoms based on the approximate surface geometry matched to the actual surface geometry,
 (xiv) Determining a volume enclosed by the first and second field of view regions to define a reconstruction volume, and
 (xv) Reconstructing the three-dimensional atomic distribution of detected atoms in the reconstruction volume of the sample.

It is an advantage of a method according to embodiments of the present invention that the reconstruction process is very accurate. No simplifying assumptions about the tip being axial symmetric and having a hemispherical shaped apex need to be made.

In a method in accordance with embodiments of the present invention, recording a hit map belonging to a predetermined stage of the evaporation process may comprise recording a substantially full or full hit map of the evaporation process, e.g. a hit map which comprises hits of all atoms evaporated during the evaporation process and impinging on the detector, and extracting from the full hit map a reduced hit map belonging to only the predetermined stage of the evaporation process.

In a method in accordance with embodiments of the present invention, reconstructing the three-dimensional atomic distribution of detected atoms may comprise placing an atom back to a surface of the tip, using a percentage of completion to determine the surface geometry and height of an evolving surface on which the atom has to be placed and using a one to one correlation between a location on the detector and the tip surface to determine a spatial position of the atom to be reconstructed. Using a one to one correlation between a location on the detector and the tip surface may be based on approximated trajectories while deriving launch angles.

In a method in accordance with embodiments of the present invention, dividing the hit map in a plurality of zones may comprise dividing the hit map in pixels with a suitable shape, for instance, but not limited thereto, a rectangular or square shape.

In a method in accordance with embodiments of the present invention, deriving the flight length of the selected atoms may include assuming that the atoms detected in a zone took off from a same point on the sample and have a same flight path.

In a method in accordance with embodiments of the present invention, deriving the flight length and the launch angle may be done by assuming from the sample up to a predetermined distance, a first flight projection in a high field gradient region where a tangential direction along a real flight path of the atom changes significantly, and, beyond the predetermined distance to the detector, a second flight projection in a low field gradient region, where the flight path is assumed a straight flight.

In a method in accordance with embodiments of the present invention, estimating the approximate surface geometry of the tip in a field-of-view region of the sample may comprise predefining some reference positions at intersectional points of a surface of an arbitrary sphere and straight lines from an origin of the sphere to the detected positions, and optimizing those reference positions to new positions that form the field of view region. Optimizing the reference positions may comprise changing either a surface distance or a radius of the sphere by keeping the derived launch angles.

In a method in accordance with embodiments of the present invention, measuring the actual surface geometry of the tip of the sample may be done by using any of scanning probe microscopy, transmission electron microscopy, or ptychography.

In a method in accordance with embodiments of the present invention, matching the approximate surface geometry to the actual surface geometry may comprise using an iterative closest point method, in which the approximate surface geometry is pre-aligned to the actual surface geometry, and a weighting function is added for scaling a size of the surface geometry.

In a method in accordance with embodiments of the present invention, the matching of the approximate surface geometry to the actual surface geometry may comprise:
Creating surface meshes,
Coarse matching of the approximate surface geometry and the actual surface geometry to provide an initial guess of positions for alignment,
Shifting and scaling data of the approximate surface geometry based on the initial guess, and
Fine matching of the data of the approximate surface geometry to data of the actual surface geometry.

In a second aspect, the present invention provides a system for determining a three-dimensional atomic distribution of a field of view region of a sample during an atom probe tomography process. The system comprises:
means for evaporating atoms from a sample and projecting them onto a detector,
the detector for recording a hit map comprising a hit location and a time of flight of each atom, and
a controller configured for carrying out the method of any of the previous claims.

In a third aspect, the present invention provides a computer program comprising instructions which, when the program is executed by a controller, causes the controller to carry out the steps of the method of any of the embodiments of the first aspect. Nowadays, such computer program is often offered on the Internet or a company Intranet for download, hence the present invention includes transmitting the computer program according to embodiments of the present invention over a local or wide area network and/or a data carrier signal carrying the computer program of embodiments of the third aspect. The controller may be a general purpose or a special purpose processor, including for instance one of a microprocessor and an FPGA, and may be for inclusion in a device, e.g. a system for determining a three-dimensional atomic distribution of a field of view region of a sample during an atom probe tomography process.

Embodiments of the present invention further also provide a computer-readable storage medium such as a magnetic storage device such as a hard disk, a memory key or a diskette, or an optical storage device such as a CD-ROM, having stored thereon the computer program of embodiments of the third aspect in a machine readable form.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF DRAWINGS

The invention will now be described further, by way of example, with reference to the accompanying drawings, in which.

Figure 1:
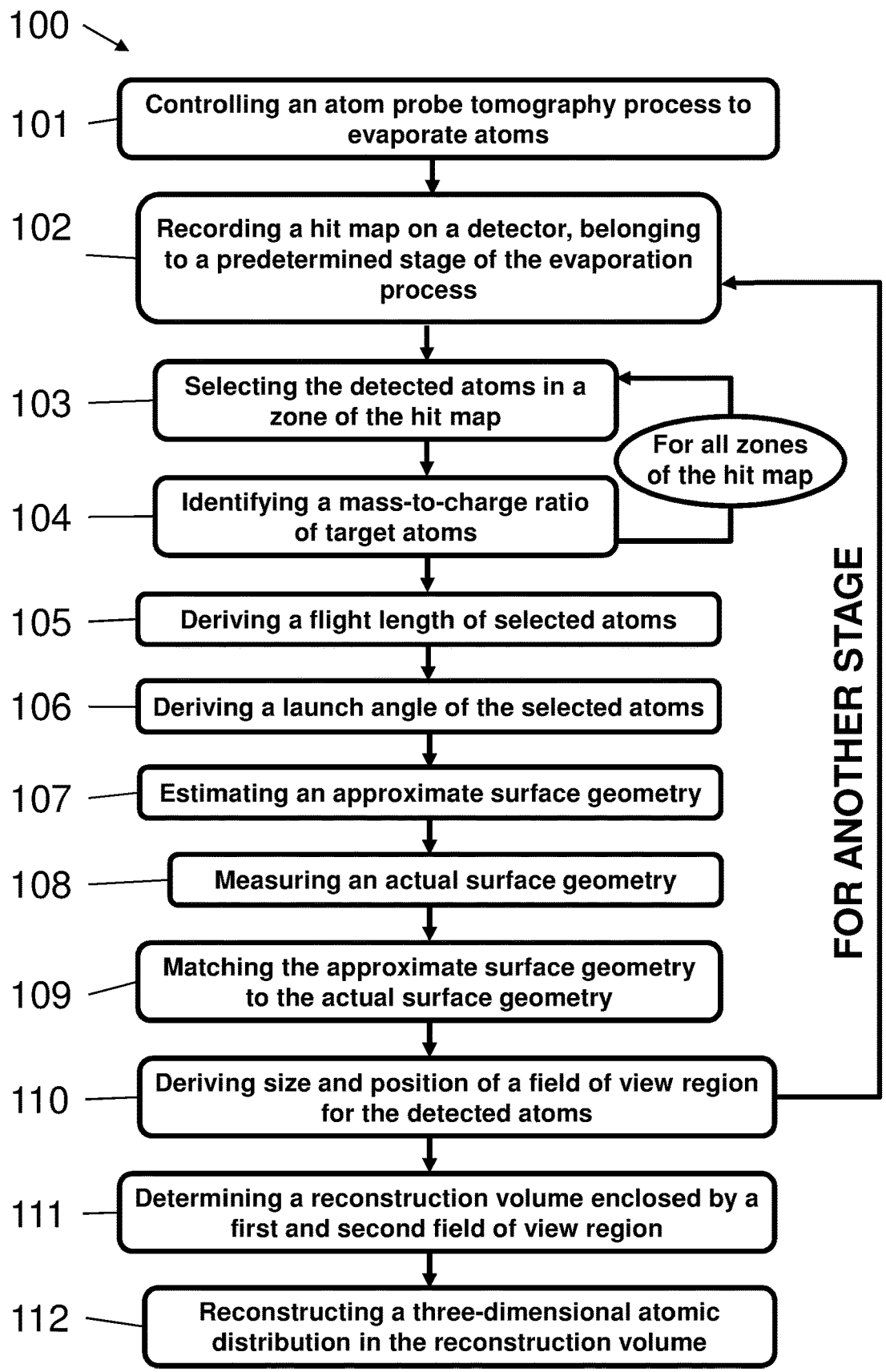
FIG. 1 schematically shows a flowchart of an exemplary method for determining of a three-dimensional atomic distribution in a sample, according to embodiments of the present invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention. Any reference signs in the claims shall not be construed as limiting the scope. In the different drawings, the same reference signs refer to the same or analogous elements.

DESCRIPTION OF EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, embodiments of the present invention relate to a method for determining a three-dimensional atomic distribution within a field of view region of a sample having a tip, during an atom probe tomography (APT) process. The method comprises carrying out an evaporation process, comprising evaporating atoms from the sample and projecting them onto a detector where they are detected.

The method further comprises recording a hit map belonging to a first predetermined stage of the evaporation process. The hit map comprises hit locations of each detected atom on the detector, and a time of flight of each detected atom, where the time of flight of each atom is identified as the travelling time between an initial position of said atom in the sample and a final position in which said atom hits the detector. The sample comprises at least one known atom type or material, referred to hereby as a reference atom, and should comprise one or more than one unknown atom type or material referred to hereby as a target atom. If the sample is made primarily of a first material such as for instance silicon, and it is desired to get to know the distribution of a second material in the first material, for instance the distribution of dopants in the silicon matrix, the reference atoms are silicon atoms, and the target atoms are the dopant atoms.

In embodiments of the present invention, recording a hit map belonging to the first predetermined stage of the evaporation process may be done by recording a full hit map during the complete evaporation process, and extracting from the full hit map a reduced hit map containing detected atoms which hit the detector only during the first predetermined stage of the evaporation process. In alternative embodiments of the present invention, recording a hit map belonging to the first predetermined stage of the evaporation process may be done by discarding all hits on the detector outside the first predetermined stage, and only storing data (hit locations and time of flight of detected atoms) relating to the first predetermined stage of the evaporation process. The predetermined stage can be any continuous period of the evaporation process which should contain enough detected atoms for analysing the change in time of the surface of the tip.

The method according to embodiments of the present invention further comprises dividing the hit map for the first predetermined stage of the evaporation process in a plurality of zones.

For each zone of the hit map belonging to the predetermined stage, the detected atoms are selected. Of these detected atoms, the mass-to-charge ratio of the reference atoms is known (reference mass-to-charge ratio), because the reference atoms are known. Based on the recorded time of flight of a target atom, its mass-to-charge ratio is identified, by comparison of the recorded time of flight of a reference atom in the sample having a reference mass-to-charge ratio. The selecting of the detected atoms of a zone of the hit map and the identifying of the mass-to-charge ratio of target atoms, is repeated for all zones of the hit map belonging to the predetermined stage of the evaporation process. A mass-to-charge spectrum is built from the identified mass-to-charge ratios, listing per identified mass-to-charge ratio the number of detected atoms on the detector during the predetermined stage of the evaporation process. The mass-to-charge spectrum may be represented as a graph with peaks. The mass-to-charge value with the highest counts in a peak represents the mass-to-charge value of all the atoms from this peak. The deviation of the mass-to-charge values in a peak indicates that variation of flight lengths of the atoms represented by the peak.

The method according to embodiments of the present invention further comprises deriving a flight length of selected atoms of an arbitrary element in a peak of the mass-to-charge spectrum, wherein the flight length of each atom is identified as the length between the initial position and the final position. The method further comprises deriving a launch angle of the selected atoms, where the launch angle of each atom is identified as the angle between a straight line of the apex axis which is perpendicular to the detector, and an extension line of a launching direction from a point at the initial position of said atom which is assumed perpendicular to a tip surface.

The method further comprises, based on the derived launch angles of the selected atoms, estimating an approximate surface geometry of a tip in a first field of view region of the sample. The method further comprises measuring an actual surface geometry of the tip of the sample, and matching the approximate surface geometry to the actual surface geometry. The method further comprises deriving size and position of a first field of view region for the detected atoms based on the approximate surface geometry matched to the actual surface geometry.

The method then further comprises recording a hit map belonging to a second predetermined stage of the evaporation process. Similarly to the recording of the hit map belonging to the first predetermined stage of the evaporation process, the recording of the hit map belonging to the second predetermined stage of the evaporation process may comprise recording a full hit map during the complete evaporation process (the same full hit map which was used for the recording of the hit map belonging to the first predetermined stage of the evaporation process), and extracting from the full hit map a reduced hit map containing detected atoms which hit the detector only during the second predetermined stage of the evaporation process. In alternative embodiments of the present invention, recording a hit map belonging to the second predetermined stage of the evaporation process may be done by discarding all hits on the detector outside the second predetermined stage, and only storing data (hit locations and time of flight of detected atoms) relating to the second predetermined stage of the evaporation process. The second predetermined stage can be any continuous period of the evaporation process which contains enough detected atoms for analysing the change in time of the surface of the tip.

In what follows, similar steps performed for the first predetermined stage of data are carried out for second predetermined stage of data. The steps comprise identifying mass-to-charge ratio for those detected atoms of the second predetermined stage and deriving the flight length as well as the launch angles of a selected peak in a calibrated mass-to-charge ratio spectrum.

Size and position of a second field of view region for the detected atoms may be derived based on the approximate surface geometry matched to the actual surface geometry.

The method further comprises determining a volume enclosed by the first and second field of view regions to thus define a reconstruction volume. Finally, the method comprises reconstructing the three-dimensional atomic distribution of the sample in the reconstruction volume.

By way of illustration, embodiments not being limited thereto, further standard and optional features of exemplary embodiments according to the present invention will be described with reference to the drawings.

Figure 2:
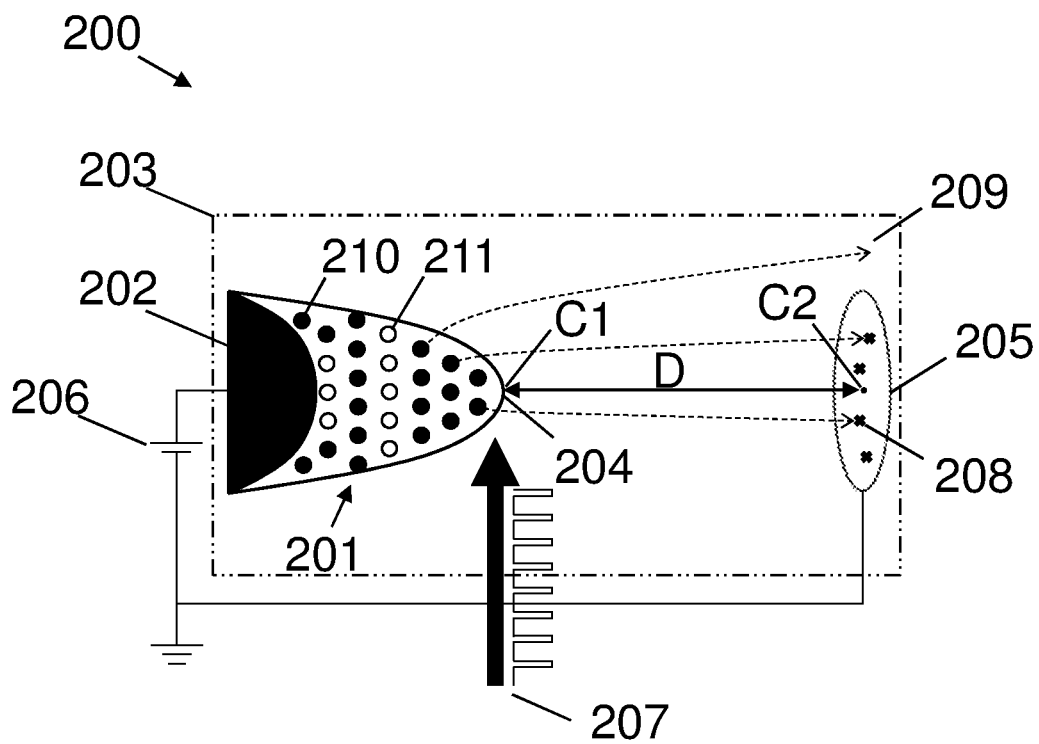
FIG. 2 schematically shows an example of an atom probe tomography process according to embodiments of the present invention.

A method 100 for determining a three-dimensional atomic distribution of a sample according to embodiments of the present invention is illustrated in FIG. 1. The method 100 comprises carrying out an evaporation process, comprising evaporating 101 atoms from the sample and projecting them onto a detector 205 where they are detected. An example of the evaporation process 200 is shown in FIG. 2 (not to scale). The evaporation process 200 comprises obtaining the sample 201 mounted on a sample holder 202 and positioning the sample 201 into a chamber, e.g. a vacuum chamber 203. The sample 201 is sharpened such that it has a tip 204 that is sufficiently sharp, e.g. the tip has a radius that is less than 50 nm. The tip 204 has a point C1 at a the top surface position of the apex. The tip 204 may be symmetric or asymmetric at any point in time before the evaporation process, during the evaporation process, or after the evaporation process.

The vacuum chamber 203 further comprises a position-sensitive detector 205, e.g. an ion detector, that can measure the position of impinging particles in two dimensions on a sensor surface. The ion detector 205 has a geometry with a central point C2 at a central position thereof. The ion detector 205 may for instance have a circular geometry, a rectangular geometry, or any other suitable geometry. The ion detector 205 has a detection efficiency of at least 50%, for example between 50% and 70%, meaning that only 50% to 70% of the ions that reach the detector will be recorded. The sample 201 is positioned in the vacuum chamber 203 such that the apex point C1 and the central point C2 are at a distance D. The apex point C1 and the central point C2 are aligned, such that they both lie on a straight line passing through the apex point C1 substantially orthogonal to the tip 204, and passing through the central point C2 substantially orthogonal to the detector 205. In an ideal condition, the deviations on the positions of C1 and C2 should be very small, e.g. less than a few micrometers, preferably less than several tenths of micrometers. However, in a real case, several millimeters of deviations could be possible.

Carrying out the evaporation process comprises applying a voltage bias between the sample and the detector 205, close to a threshold of breaking atomic bonds, with optionally a superimposed train of laser pulses impinging on the sample. An example is shown in FIG. 2, wherein a voltage bias 206 is applied between the sample holder 202 and the detector 205. The sample holder 202 is for example made of Tungsten wires mounted on a conductive holder, wherein the conductive holder has a lower electrical resistance than the supported Tungsten wire and the tip. The voltage bias 206 applied may for example be between 2 and 10 kV. The voltage bias creates an electric field between the sample and the detector, with an intensity of for example 10 V/nm or higher. The train of laser pulses 207 impinging on the tip 204 of the sample 201 may be introduced as a supplement of the thermal energy, which helps atoms at the apex of the sample 201 to overcome the energy barrier of evaporation. Laser pulses in the train of laser pulses 207 may for example have a pulsing frequency between 1 and 300 kHz or higher. The wavelength of the laser pulses in the train of laser pulses 207 generated by the laser source may for example be between 300 nm and 1200 nm, such as for instance 1030 nm for IR laser, 515 nm for green laser, 343 nm for UV laser or other laser sources in different wavelengths. The intensity of the electric field caused by the voltage bias 206 should be sufficiently close to a threshold of breaking atomic bonds of atoms in the sample 201. Consequently, a superposition of the laser pulses in the train of laser pulses 207 with sufficiently high intensity on the voltage bias 206 results in breaking the atomic bonds of atoms in the sample 201, and results in evaporating atoms from the sample 201.

During evaporating atoms from the sample 201, the atoms are ionized to become ionized atoms which are detached from the tip 204 and accelerated toward the detector 205 according to the electric field distribution between the tip 204 and the detector 205. For example, during applying the voltage bias 206, one laser pulse in the train of laser pulses 207 may evaporate one atom in the sample 201, or one laser pulse in the train of laser pulses 207 may evaporate a plurality of atoms in the sample 201, or a plurality of laser pulses in the train of laser pulses 207 may evaporate one atom in the sample 201. To avoid two signals hitting simultaneously on the detector 205 in the same pulse and to avoid spending too much time on an experiment, the evaporation flux is preferable adjusted to a condition in which a plurality of laser pulses evaporate one single atom.

In the absence of applying the voltage bias 206, the laser pulses in the train of laser pulses 207 alone do not result in evaporating atoms in the sample 201. In the absence of the laser pulses in the train of laser pulses 207, applying the voltage bias 206 alone does not result in evaporating atoms in the sample 201.

The sample 201 to be analysed comprises atoms of a known, reference atom type, and atoms of one or more unknown, target atom types. An APT user usually has prior knowledge about the major element of a measured sample, which thus is the reference atom type. The reference atom type 210 has a first number of atoms in the sample 201. The target atom type 211 has a second number of atoms in the sample 201.

The evaporated atom may hit the ion detector 205, e.g. the evaporated atom may have its hit point on the ion detector 205, e.g. a first hit point 208. If the hit point of the evaporated atom is on the ion detector 205, e.g. the first hit point 208, the atom is said to be within the field of view. Alternatively, the evaporated atom may not hit the ion detector 205, e.g. the evaporated atom may have its hit point off the ion detector 205, e.g. a second hit point 209. If the hit point of the evaporated atom is off the ion detector 205, e.g. the second hit point 209, the atom is said to be outside of the field of view.

Figure 3:
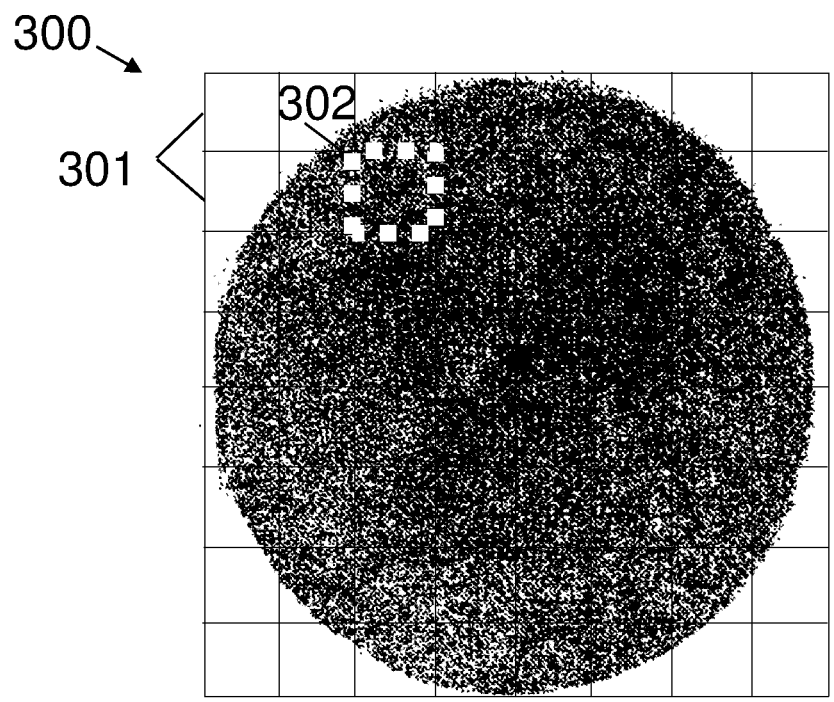
FIG. 3 shows an example of a hit map as used in embodiments of the present invention.

The method 100 further comprises recording 102 a hit map belonging to a first predetermined stage of the evaporation process, for instance a hit map belonging to a last predetermined number of second, e.g. the last 180 seconds, of the evaporation process, or a hit map belonging to a last predetermined number of atoms, e.g. the last 100.000 atoms, being detected by the detector 205. The hit map comprises hit locations of each detected atom on the detector 205, and an associated time of flight of each of the detected atoms. The time of flight of each evaporated atom is identified as the travelling time in between when the ionized atom is detached from the tip 204 (initial position of the atom on the tip), e.g. due to a pulse in the train of laser pulses 207, and when the ionized atom hits the ion detector 205 (final position on the detector). A continuous period of the evaporation process is defined as the predetermined stage which ranges enough detected atoms 103 for analysis, as illustrated in the hit map shown in 300 in FIG. 3.

In embodiments of the present invention, recording a hit map 300 belonging to a predetermined stage of the evaporation process may comprise recording a full hit map of the evaporation process, comprising hit locations of each detected atom on the detector during the evaporation process, and an associated time of flight for each of the detected atoms, and extracting from the full hit map a reduced hit map which only comprises hit locations and associated times of flight for atoms having hit the detector and belonging to the predetermined stage of the evaporation process.

The method further comprises dividing the hit map 300 belonging to the predetermined stage of the evaporation process in a plurality of zones. The hit map 300 may for instance be divided into a regular array of zones 301, 302 e.g. rectangular zones with predetermined dimensions, for instance, dimensions between 0.2 cm×0.2 cm and 0.5 cm×0.5 cm each. However, this is not limiting to the present invention. The hit map 300 may be divided in a regular or an irregular array of zones 301. The zones 301 may or may not all have the same dimensions. The zones may have a rectangular or square shape or may be of any other suitable geometry. After dividing the hit map 300 into the zones 301, each zone is analysed separately from other zones.

Evaporated atoms are detected on the detector 205 sequentially, and the atoms belonging to a predetermined stage of the evaporation process which have hit the detector in a particular zone 301 are selected 103 to derive a surface geometry corresponding to said selected atoms. As an example only, the present invention not being limited thereto, the last 100,000 detected atoms may be selected 103 to derive the surface of a first field of view region belonging to a first predetermined stage, e.g. the surface after the evaporation process.

Figure 4:
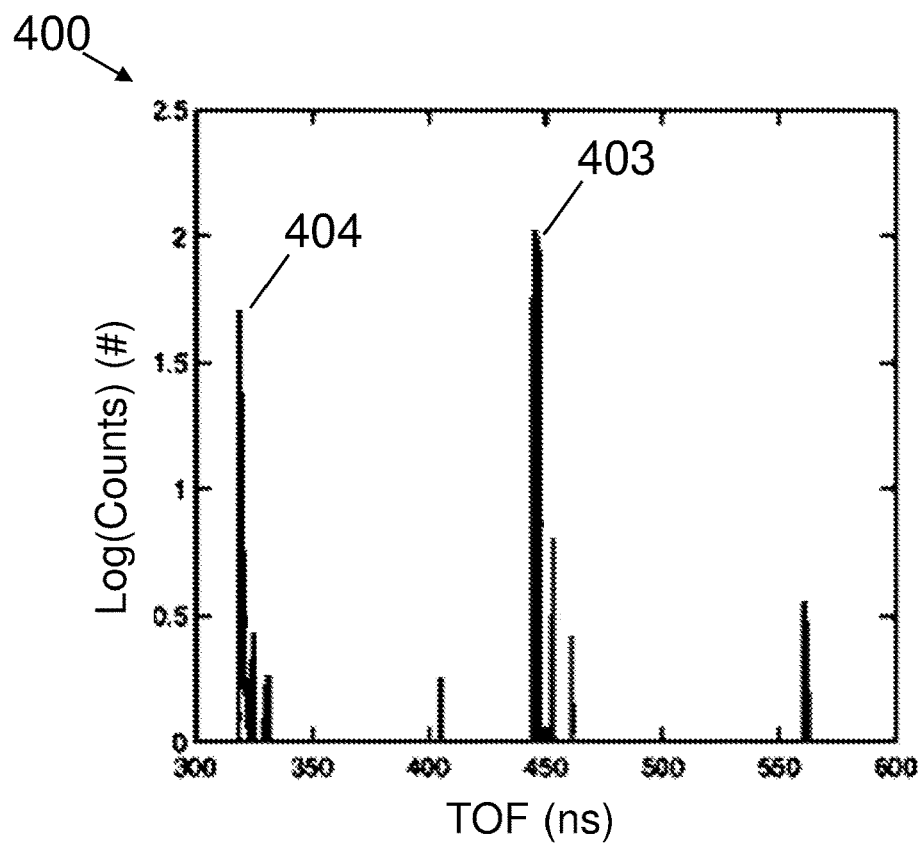
FIG. 4 is a graph showing an example of time of flight of different types of atoms in a selected zone of the hit map versus a number of said different types of atoms, as used in embodiments of the present invention.

As the time of flight is recorded for every detected atom of the predetermined stage of the evaporation process in the hit map 300, the number of atoms detected in zone 302 having the same time of flight, or the same time of flight within a predetermined error margin, can be counted. An example graph 400 of the different times of flight for atoms detected in the first zone 302 of the hit map 300 is shown in FIG. 4. The time of flight is drawn on a horizontal axis (expressed in nanoseconds), versus a number of hit points on a vertical axis (on a logarithmic scale). The statistic results show several peaks in time-of-flight bins. Every time-of-flight bin corresponds to a particular type of atom being detected. The number of hit points of different types of atoms corresponds to the presence of a number of atoms of said different types of atoms in the sample 201. Typically, a sample will have a reference atom type with a number of atoms substantially higher than the number of atoms of the target atom type. Therefore, it is possible to deduce that a highest peak 403 e.g. in the example illustrated with a time of flight around 450 ns, belongs to the reference atom type 210 in the sample 201. Other peaks, for instance a second highest peak 404 e.g. in the example illustrated with a time of flight around 320 ns, belongs to a target atom type 211 in the sample 201.

The method 100 further comprises, based on the recorded time of flight of an atom, identifying 104 the mass-to-charge ratio $$\left(\frac{m}{n}\right)$$

of the target atoms, by comparison of the recorded time of flight with the recorded time of flight of the reference atoms. In particular, one is interested in the mass-to-charge ratio $$\left(\frac{m}{n}\right)_2$$

of atoms of the target atom type in the sample 201. The identification is done by comparing a time of flight $tof_2$ of an atom of the target atom type 211 in the sample 201 (hence in the example illustrated of the second highest peak 404) with a reference time of flight $tof_1$ of an atom of the reference atom type 210 (hence of the highest peak 403 in the example illustrated) in the sample 201, having a reference mass-to-charge ratio $$\left(\frac{m}{n}\right)_1.$$

The target atom type 211 may for example be double charged Silicon $28^{2+}$, or dopant atoms like Boron for instance. The reference atom type 210 may for example be single charged Silicon $28^+$.

The target time of flight $tof_2$ of the target atom type 211 in the sample 201, and the reference time of flight $tof_1$ of the reference atom type 210 in the sample 201 are described by a first equation and a second equation as:

$$tof_1 = L_1 \cdot \sqrt{\frac{\left(\frac{m}{n}\right)_1}{2\ eV_1}}$$

$$tof_2 = L_2 \cdot \sqrt{\frac{\left(\frac{m}{n}\right)_2}{2\ eV_2}}$$

wherein $L_2$ is a target flight length corresponding to the target atom type 211 in the sample 201, $L_1$ is a reference flight length corresponding to the reference atom type 210 in the sample 201, e is the elementary charge, $V_2$ is the voltage bias 206 applied to evaporate atoms in the target atom type 211 in the sample 201, and $V_1$ is the voltage bias 206 applied to evaporate atoms in the reference atom type 210 in the sample 201. To solve the first equation and the second equation for the target mass-to-charge ratio $$\left(\frac{m}{n}\right)_2$$

of the target atom type 211 in the sample 201, an assumption is made. In the assumption, since the tip 204 in the sample 201 has a size that is at least five orders of magnitude smaller than the target flight length and the reference flight length, the detected atoms in a zone are assumed taking off from a same point. Additionally, atoms of the reference atom type 210 and atoms of the target atom type 211 in the example graph 400 all correspond to the same zone e.g. the first zone 302. Therefore, deviation of the target flight length and reference flight length to the same zone can be neglected, and therefore $L_1$ and $L_2$ are assumed to be equal. Solving the first equation and the second equation for the target mass-to-charge ratio $$\left(\frac{m}{n}\right)_2$$

of the target atom type 211 in the sample 201 based on the above assumptions results in a third equation:

$$\left(\frac{m}{n}\right)_2 = \left(\frac{m}{n}\right)_1 \cdot \left(\frac{V_2 \cdot tof_2^2}{V_1 \cdot tof_1^2}\right)$$

The third equation comprises only one unknown being the target mass-to-charge ratio $$\left(\frac{m}{n}\right)_2$$

of the target atom type 211 in the sample 201. Hence, the target mass-to-charge ratio $$\left(\frac{m}{n}\right)_2$$

can be calculated.

The same equation may be applied to obtain the mass-to-charge ratios for atoms of other peaks in the time of flight graph 400 from the selected first zone 302 of the hit map 300.

Figure 5:
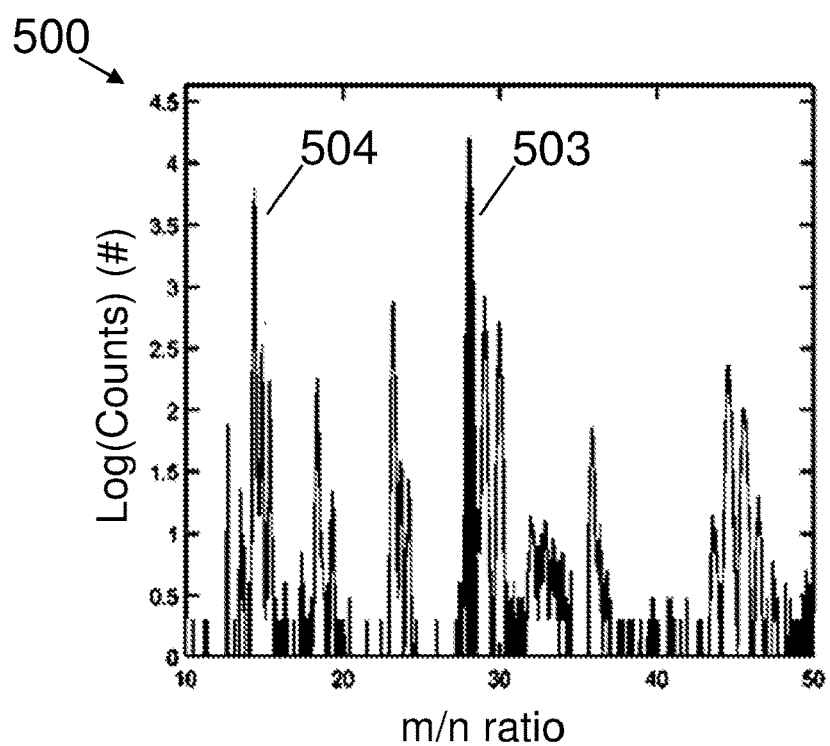
FIG. 5 is a graph showing an example of mass-to-charge ratios of different types of atoms versus a number of said different types of atoms, as used in embodiments of the present invention.

The same algorithm is continuously applied to other zones of the hit map 300 until all the zones are analysed. The calibrated mass-to-charge ratios for all the selected atoms belonging to the first predetermined stage of the evaporation process, e.g. the last 100,00 detected atoms, may be plotted on a horizontal axis in a calibrated mass-to-charge spectrum graph 500, as in FIG. 5, in function of the number of atoms of each of the different types of atoms in the sample 201, on a vertical axis (on a logarithmic scale), for all zones in the hit map 300. In FIG. 5, a highest peak 503 corresponds to the highest peak 403 in FIG. 4, which corresponds to the reference atom type 210, and a second highest peak 504 corresponds to the second highest peak 404 in FIG. 4, which corresponds to the target atom type 211.

The method 100 further comprises deriving 105 the flight length of selected atoms of an arbitrary element in a peak of the mass-to-charge spectrum 500. In the calibrated mass spectrum, in FIG. 5, the m/n ratio with the highest counts in a peak represents the mass-to-charge ratio of all atoms from this peak. The deviation of m/n ratios in the peak indicates the variation of flight length. Therefore, a user can range either one of the peaks, and use the following equation (corresponding to the second equation) to calculate the flight length for atoms in this peak:

$$m/n = 2 \; eV \cdot (tof/L)^2$$

where e represents the elementary charge, V is the applied voltage, L is the flight length from a taking off position to a hitting position on the detector and tof represents the corresponding flight time. For example, the peak 503 with a representative m/n value equal to 28.1 may be selected, and a flight length for each of the atoms in the peak may be calculated.

Figure 6:
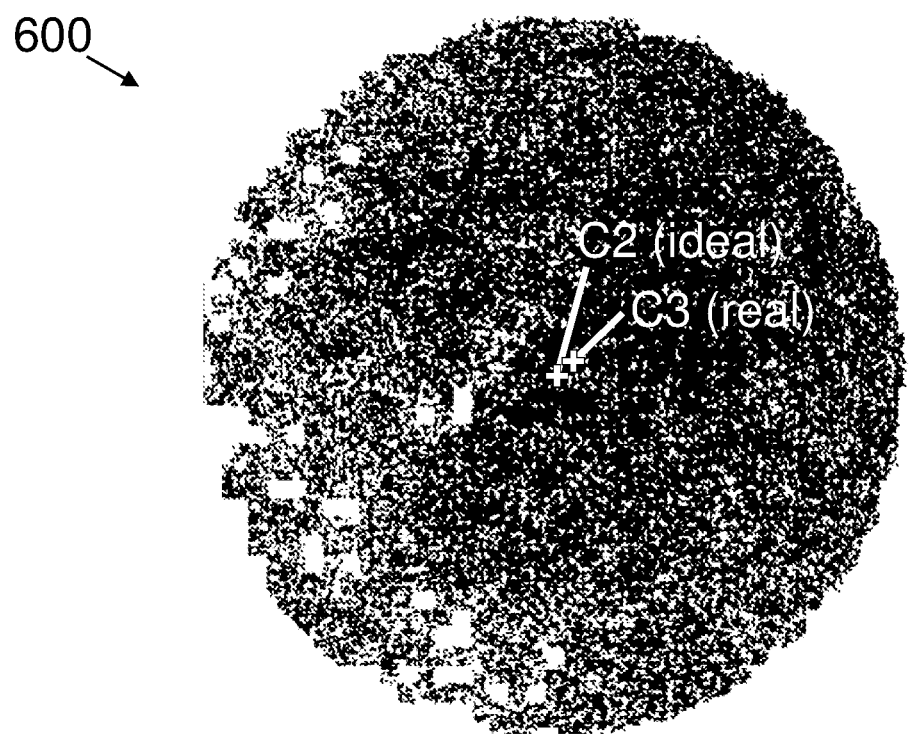
FIG. 6 shows an example of a partial hit map for a reference atom type as used in embodiments of the present invention.

Further, the calibrated mass-to-charge graph 500 of FIG. 5 in combination with the hit map 300 can be used to extract a partial hit map for any type of atoms in the sample 201, i.e. a partial hit map for atoms of one peak in the mass-to-charge spectrum graph 500, e.g. the partial hit map 600 in FIG. 6 for the highest peak 503 of the reference atom type 211.

Figure 7:
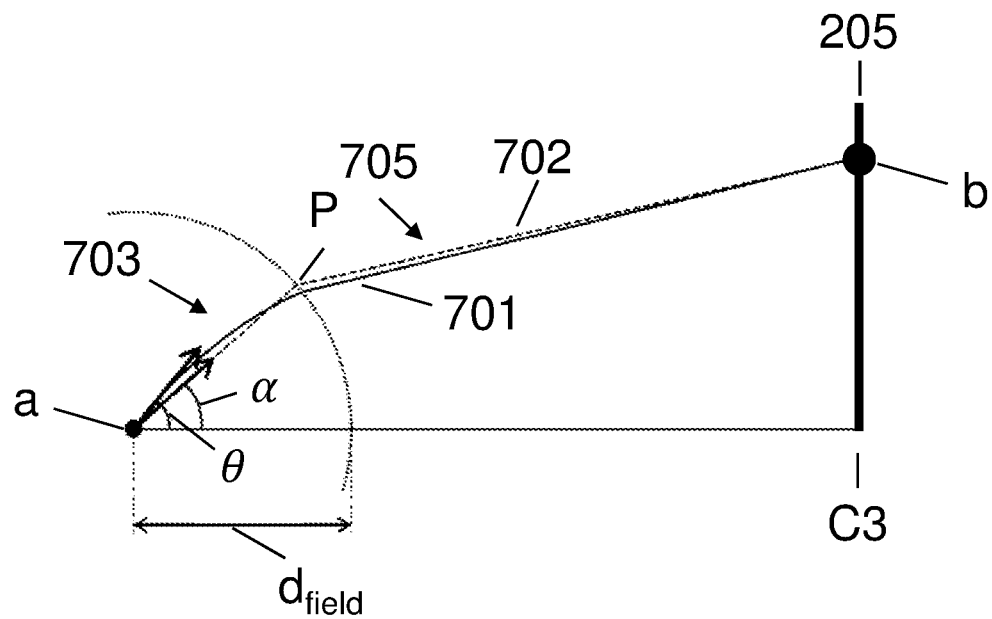
FIG. 7 schematically illustrates deriving a launch angle of an atom, according to embodiments of the present invention.

The method 100 further comprises deriving 106 a launch angle of the selected atoms. Since the size of an APT tip is at least five orders of magnitude smaller than the flight length, as stated before, all the evaporated atoms can be assumed taking off from the same point. FIG. 7 shows an actual flight path 701 of an atom taking off from an original point a with a launch angle θ and reaching the detector at a hit position b. The derived flight length L is insufficient to accurately depict a real trajectory of an atom which means that the correct launch angle θ is difficult to derive.

The aim of embodiments of the present invention, therefore, is to derive an estimated launch angle α of an estimated flight path 702 (dashed line) of an atom evaporated from the sample 201. As stated before, it is assumed that the initial position of the evaporated atom is at point a on the tip 204, and the final position of the atom is at point b on the detector 205. In an ideal condition, point a is on a straight line passing through the central point C2 of the detector 205, and substantially orthogonal, or even orthogonal, to the detector surface. For a real case in this example, based on the assumption that the atom on the surface of the apex flies straight to the detector, point a is defined on a straight line passing through the position C3 with the shortest flight length, on the detector 205, as shown on the partial hit map 600. The deviation on the positions of an ideal point C2 compared to the point C3 is very small, e.g. less than a few millimeters.

Computing the electric field from electrostatic simulations reveals that the electric field changes severely near the apex of the tip 204, while after a predetermined distance the variation of the electric field decreases. Deriving 106 the launch angle may be done by assuming from the sample up to a predetermined distance $d_{field}$, a first flight projection in a high field gradient region where a tangential direction along a real flight path of the atom changes significantly, and, beyond the predetermined distance to the detector (205), a second flight projection in a low field gradient region, where the flight path is assumed a straight flight.

This is shown in FIG. 7. The tangential directions along a real flight path 701 are assumed to change significantly in a first flight projection in a high field gradient region in the defined predetermined distance $d_{field}$ and the path beyond it is assumed a straight flight toward the detector. With this assumption, the real trajectory 701 can be simply fitted by two straight lines 703, 705 forming the estimated flight path 702, with a transition point P lying on the distance of $d_{field}$ from the taking off position a, where the total distance of the two straight lines equals the real flight length that was derived earlier for the atom. The resulting angle α between the apex axis and the direction to the transition point can then be used as an approximation to the real launch angle θ. The distance $d_{field}$ is a constant value and is applied to derive the launch angles for all the atoms.

Figure 8:
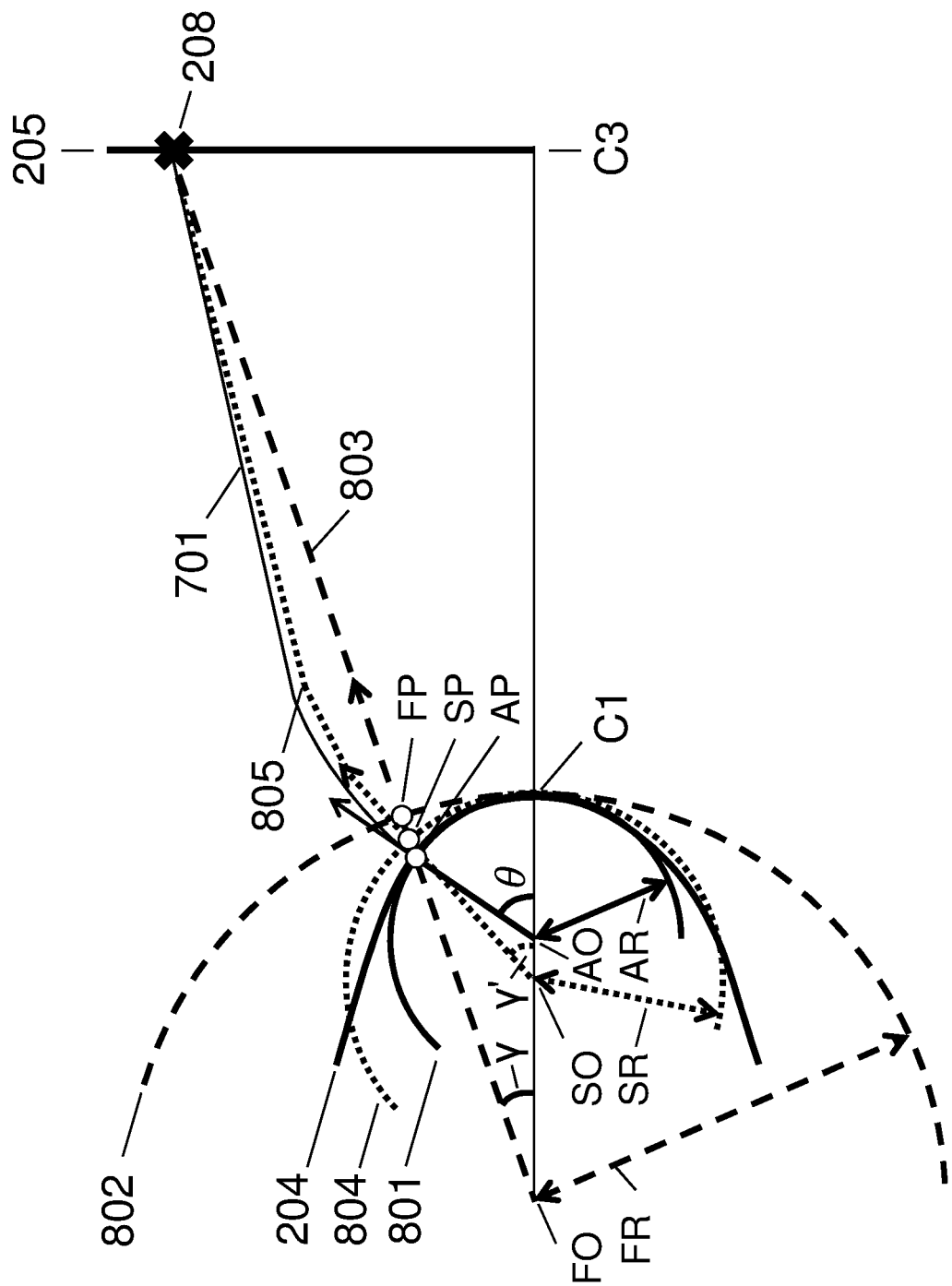
FIG. 8 schematically illustrates estimating an approximate surface geometry according to embodiments of the present invention.

The method 100 further comprises, based on the derived launch angles of the selected atoms, estimating 107 an approximate surface geometry of the tip 204 in a first field of view region of the sample 201, as shown in FIG. 8. For the estimating 107, one should find ideal taking off positions on a tip surface for all of the detected atoms.

Firstly, the apex axis is aligned such that a straight line passing through the point C1 at the apex position of the tip and substantially orthogonal, or preferably orthogonal, to the tip surface is passing through the point C3 with the shortest flight length on the detector 205 and is substantially orthogonal, or preferably orthogonal, to the detector surface. FIG. 8 shows an atom taking off from an actual point AP on the surface of the tip 204, with the actual flight path 701 and an actual launch angle θ. The initial direction of the atom is normal to the tip surface, and the atom lands on the detector 205 at a hit position 208. The tip 204 can be approximated by an actual sphere 801 (e.g. illustrated by means of a solid line), with an actual radius AR and an actual origin AO, wherein the actual sphere 801 passes through the apex point C1 of the tip 204. The actual launch angle θ is between a straight line orthogonal to the tip 204 and passing through the actual point AP and through the actual origin AO, and a straight line passing through the apex point C1 and substantially orthogonal to the tip 204, and passing through the point C3 with the shortest flight length and substantially orthogonal to the ion detector 205.

The estimating 107 starts with assuming a first reference sphere 802 (e.g. illustrated by means of a dashed line in FIG. 8) with a first reference radius FR and a first reference origin FO lying on the apex axis, wherein the first reference sphere 802 passes through the apex point C1 of the tip 204. The location of the first reference origin FO is defined on the apex axis with the distance equals to the summary of the shortest flight length and the first reference radius FR. A first reference point FP is placed on a crossing point between the first reference sphere 802 and a straight line from the first reference origin FO to the hit point 208 on the detector 205, with a straight line angle γ between said straight line and the apex axis.

Since the actual launch angle θ is approximated by the angle α derived from the flight length, if the launch angle α derived from the flight length is larger than the straight line angle γ, the first reference radius FR of the first reference sphere 802 is scaled in a scaling process to a second reference radius SR of a second reference sphere 804 (e.g. illustrated by a dotted line), which still passes through the apex point C1 of the tip 204, with a second reference origin SO on the tip axis. A second reference point SP is defined as the cross point between the line of the straight flight path 803 and the second reference sphere. A curved flight path 805 is assumed from the second reference point SP to the hit point 208. During the scaling, the edge of the sphere remains aligned to point C1 by shifting the original point FO along the tip axis to SO and moving the reference point FP to SP, causing an increment of the launch angle from γ to γ'. The scaling process continues until the launch angle γ' matches the previously derived launch angle α.

The position of a reference point e.g. the first reference point FP or the second reference point SP or a further reference point if the scaling process has continued and has led to one or more further reference points, at the end of the scaling process, is considered as a possible taking off position of an atom on the tip surface. The estimating 107 process and the scaling process are performed for all of the evaporated atoms. Finally, a distribution of reference points forms an approximate surface geometry.

Figure 9:
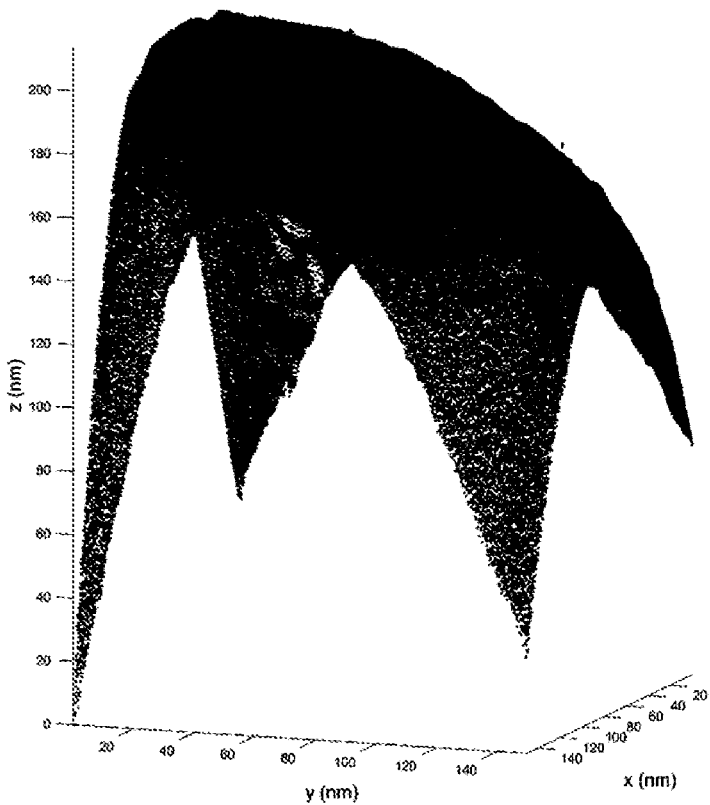
FIG. 9 shows an example of measuring an actual surface geometry as used in embodiments of the present invention.

The method 100 further comprises measuring 108 an actual surface geometry of the tip 204 of the sample 201. The measuring may, for instance, be done by atomic force microscopy (AFM), scanning probe microscopy, transmission electron microscopy (TEM), ptychography, or by any other suitable measurement technique. An example three-dimensional surface of a measured tip using AFM is shown in FIG. 9.

Figure 10:
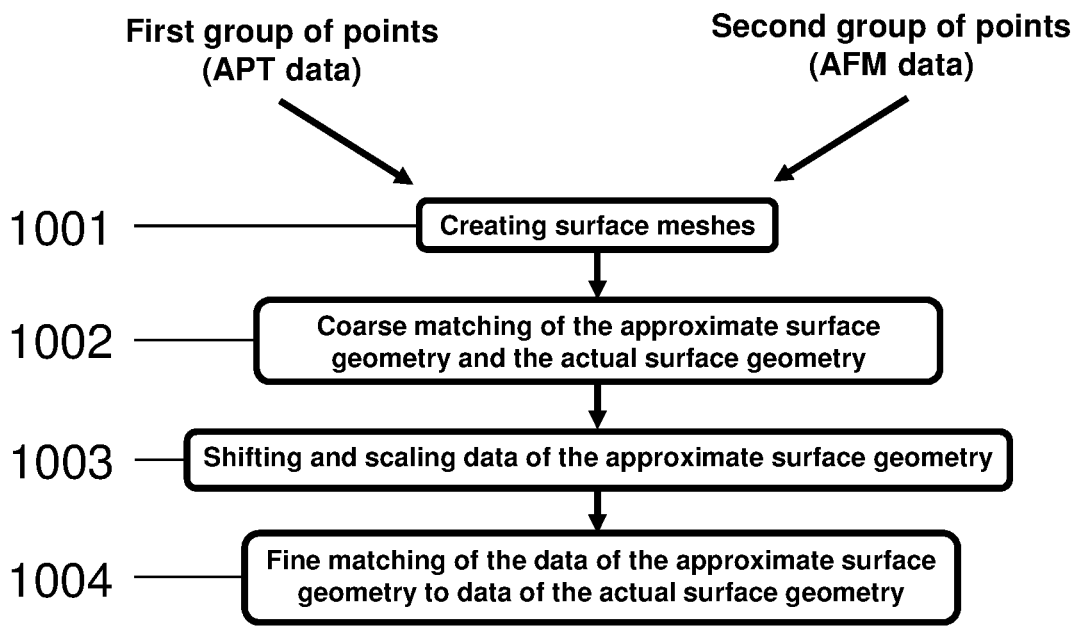
FIG. 10 schematically shows steps of surface matching of the approximate surface geometry to the actual surface geometry according to embodiments of the present invention.

The method further comprises matching 109 the approximate surface geometry to the actual surface geometry of the tip 204 of the sample 201. The matching may be done by a coarse surface matching process followed by a non-standard iterative closest point (ICP) method in a series of steps as shown in FIG. 10. The ICP method can be replaced by any other suitable method. In the present case, the matching is done for a first group of scattered points representing the approximate surface geometry derived from APT data in the estimating step 107, and a second group of points representing the actual surface geometry from the step 108, measured by e.g. AFM. The matching 109 starts with creating 1001 surface meshes. After that, coarse surface matching 1002 matches the created 1001 smoothed and meshed surfaces of the first and of the second groups of scattered points. The matching 1002 provides an initial guess of positions that the first group of points should be shifted to i.e. initial alignment, to match the actual surface of the second group of points, and a size that the first group points should be scaled at, to match the actual surface of the second group of points. Matching 109 further comprises shifting and scaling 1003 the first group of points based on the initial guess in 1002. The scaling is done using a weighting function. The shifted and scaled data of the first group of points has a first centroid, and the second group of points has a second centroid. The ICP comprises aligning the first centroid to the second centroid, or the second centroid to the first centroid in iterations. Further, the ICP comprises fine matching 1004 the two groups of points in iterations until a minimum distance between the two groups of points is found, e.g. fine matching the data of the approximate surface geometry to data of the actual surface geometry. In general or in ICP, rotating data points is allowed in all directions. In accordance with embodiments of the present invention, however, the rotation may be disabled because the apex axes of the derived tip geometry and the SPM measured tip are aligned as well as the laser coming directions. A weighting function is added for scaling a size of the surface geometry. An updated first group of points and second group of points is recorded after each iteration, and a closest point in the second group of points to each point in the first group of points, or the opposite, is identified. The ICP method requires a level of accuracy for both the first group of points and the second group of points. Here, it is assumed that the first group of points is matched to the second group of points; however, the opposite would also be possible. A matched region of two groups of data defines 110 a first field-of-view region belonging to a first predetermined stage of the evaporation process e.g. the last 100,000 detected atoms.

To determine 111 a volume to be reconstructed, a hit map belonging to a second predetermined stage of the evaporation process is required 102, e.g. recorded as such or extracted from the full hit map as explained above with reference to recording the hit map belonging to the first predetermined stage in the evaporation process. Hence other detected atoms are selected 103 belonging to the second predetermined stage of the evaporation process to define a second FOV region. As an example only, the invention not being limited thereto, the surface of the first FOV region may be the surface at the end of the evaporation process, and the surface of the second FOV region may be the surface at the beginning of the evaporation process. To define the surface of the second FOV region, another group of detected atoms e.g. the first 100,000 detected atoms are selected 102 and the steps 103 to 110 in method 100 are repeated. Further detailed explanation is left out here, and reference is made to the description above relating to determining the first field of view region.

Subsequently, the region enclosed by the two determined FOV regions e.g. the first field of view region and the second field of view region, determines 111 the volume to be reconstructed, further called reconstruction volume. The number of detected atoms corresponding to the surface of the second FOV region, and the number of detected atoms corresponding to the surface of the first FOV region may or may not be the same.

The method 100 further comprises reconstructing 112 the three-dimensional atomic distribution of the field of view of the tip 204 of the sample 201. The reconstructing 112 is done over the reconstruction volume, which should ideally have exactly a same geometry and volume as the enclosed region of the FOV surfaces in 111. Reconstructing 112 may comprise placing atoms detected on the detector 205 back into their initial positions on the tip 204 of the sample 201. This is done using a percentage of completion to determine the surface geometry and reconstruction height of an evolving surface on which the atom has to be placed and using a one to one correlation between a location on the detector and the tip surface to determine a spatial position of each atom to be reconstructed e.g. a launch position on the tip surface for each detected atom. The percentage of completion is a percentage of the reconstructed volume to a total volume of the field of view, and is introduced to evaluate the completion of the reconstruction which is utilized to define in time the reconstruction height of the tip surface on which a queried atom is to be placed. An evolving surface geometry of intermediate surfaces can be linearly interpolated between the first and the second FOV region; or alternatively method steps 102 to 110 can be repeated for different stages of the evaporation process. According to the estimated flight path, also referred to as a trajectory, while deriving launch angles, the detector surface can be divided into several zones and each zone on the detector can be registered to a corresponding surface on the tip surface. Since the trajectory is independent of the atomic mass and the charge state of the atom, this one to one correlation sustains for all different elements of detected atoms. Hence, the spatial position of the launch position can also be defined.

Figure 11:
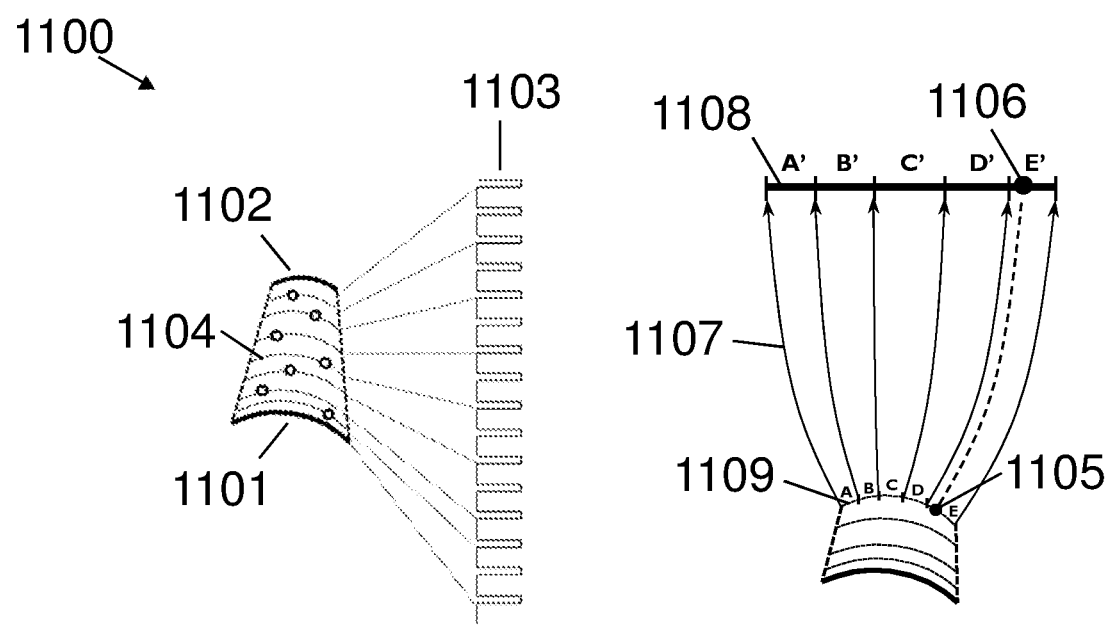
FIG. 11 schematically shows an example of reconstruction of the three-dimensional atomic distribution in the field of view according to embodiments of the present invention.

An example of a reconstructed volume 1100 is shown in FIG. 11. The reconstructed volume 1100 is enclosed by a first field of view region 1101 and a second field of view region 1102. The first field of view region 1101 may for instance be the field of view region at a first point in time in which the APT process ends, corresponding to the percentage of completion of reconstruction of zero percent. The second field of view region 1102 is the field of view region at a second point in time in which the APT process begins, corresponding to the percentage of completion of the reconstruction of a hundred percent. The final stage of the evaporation process is set to zero percentage of completion of reconstruction because the reconstructing starts from the surface of the final FOV by reversing the sequence of evaporation 1103 i.e. last detected atom is reconstructed first. The total reconstructed volume comprises the volumes of detected atoms and missed atoms which depends on the detection efficiency of the detector 205. Since the detection efficiency and the pulsing frequency of the laser are known parameters, a reconstructed volume in between pulses can be calculated according to the required pulses between detected atoms. This enables calculating the percentage of completion in time, while reconstructing each atom. Hence, the reconstruction height and the evolving surface geometry at the corresponding pulse when each atom is detected can be derived. For example, the reconstruction height and the intermediate surface 1104 on which an atom took off from position 1105 and reached position 1106 on the detector are derived. Based on the trajectories 1107 of the atoms of the extracted surface 1104, the detector surface is divided into a plurality of zones and each zone, for example, zone 1108 on the detector can be registered to a zone 1109 on the tip surface. Therefore, the take-off position 1105 of the detected atom at a position 1106 can be reconstructed.

In a further aspect, the present invention also relates to processing systems adapted for performing the different method steps of method embodiments as described above. The different steps may be implemented in the processing system as hardware or as software. Such a processing system may include at least one programmable processor coupled to a memory subsystem that includes at least one form of memory, e.g., RAM, ROM, and so forth. A storage subsystem may be included that has at least one disk drive and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included. The various elements of the processing system may be coupled in various ways, including via a bus subsystem. The memory of the memory subsystem may at some time hold part or all of a set of instructions that when executed on the processing system implement the step(s) of the method embodiments of the present invention. Thus, while a processing system as such is prior art, a system that includes the instructions to implement aspects of the present invention is not prior art.

Particular embodiments of the present invention relate to a system for determining a three-dimensional atomic distribution of a field of view region of a sample 201 during an atom probe tomography process 200, comprising means 206, 207 for evaporating atoms from the sample 201 and projecting them onto a detector 205, the detector 205 being adapted for recording a hit map comprising a hit location and a time of flight of each atom, and a controller configured for carrying out the method of embodiments of the first aspect of the present invention. The system is configured to automatically perform the steps of the method. Such automatic task may be performed after a user commands the system to do so, e.g. by a click on a graphically displayed button.

The present invention also includes a computer program product which provides the functionality of any of the methods embodiments according to the present invention when executed on a computing device. Further, embodiments of the present invention include a data carrier such as for example an optical storage medium or a solid-state medium, a CD-ROM, a DVD-ROM or a diskette which stores the computer product in a machine readable form and which executes at least one of the methods of the invention when executed on a computing device. Nowadays, such software is often offered on the Internet or a company Intranet for download, hence the present invention includes transmitting the computer product according to the present invention over a local or wide area network.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments. Other variations to the disclosed embodiments can be understood and effected by those skilled in the art in practicing the claimed invention, from a study of the drawings, the disclosure and the appended claims.

The invention claimed is:

1. A method for determining a three-dimensional atomic distribution of a sample having a tip, during an atom probe tomography process, the method comprising:
   (i) carrying out an evaporation process, comprising evaporating atoms from the sample and projecting them onto a detector where they are detected, the detected atoms comprising reference atoms and target atoms, (ii) recording a hit map belonging to a predetermined stage of the evaporation process, comprising hit locations of each detected atom on the detector, and a time of flight of each detected atom,
(iii) dividing the hit map in a plurality of zones,
(iv) selecting the detected atoms in a zone of the hit map,
(v) based on the recorded time of flight of the reference atoms, identifying the mass-to-charge ratio of the target atoms, by comparison of the recorded time of flight of the reference atom,
(vi) repeating steps (iv) to (v) for all zones of the hit map for building a mass-to-charge spectrum,
(vii) deriving a flight length of selected atoms of an arbitrary element in a peak of the mass-to-charge spectrum,
(viii) deriving a launch angle of the selected atoms,
(ix) based on the derived launch angles of the selected atoms, estimating an approximate surface geometry of the tip in a first field of view region of the sample,
(x) measuring an actual surface geometry of the tip of the sample,
(xi) matching the approximate surface geometry to the actual surface geometry, and
(xii) deriving size and position of a first field of view region for the detected atoms based on the approximate surface geometry matched to the actual surface geometry,
(xiii) recording a hit map belonging to another predetermined stage of the evaporation process and repeating steps (iii) to (xi), and deriving size and position of a second field of view region for the detected atoms based on the approximate surface geometry matched to the actual surface geometry,
(xiv) determining a volume enclosed by the first and second field of view regions to define a reconstruction volume, and
(xv) reconstructing the three-dimensional atomic distribution of detected atoms in the reconstruction volume of the sample.

2. The method in accordance with claim 1, wherein recording a hit map belonging to a predetermined stage of the evaporation process comprises recording a full hit map of the evaporation process and extracting from the full hit map a reduced hit map belonging to only the predetermined stage of the evaporation process.

3. The method in accordance with claim 1, wherein reconstructing the three-dimensional atomic distribution of detected atoms comprises placing an atom back to a surface of the tip, using a percentage of completion to determine the surface geometry and height of an evolving surface on which the atom has to be placed and using a one-to-one correlation between a location on the detector and the tip surface to determine a spatial position of the atom to be reconstructed.

4. The method in accordance with claim 3, wherein using a one-to-one correlation between a location on the detector and the tip surface is based on approximated trajectories while deriving launch angles.

5. The method in accordance with claim 1, wherein dividing the hit map in a plurality of zones comprises dividing the hit map in pixels with a suitable shape.

6. The method in accordance with claim 1, wherein deriving the flight length of the selected atoms includes assuming that the atoms detected in a zone took off from a same point on the sample and have a same flight path.

7. The method in accordance with claim 1, wherein deriving the flight length and the launch angle are done by assuming from the sample up to a predetermined distance, a first flight projection in a high field gradient region where a tangential direction along a real flight path of the atom changes significantly, and, beyond the predetermined distance to the detector, a second flight projection in a low field gradient region, where the flight path is assumed a straight flight.

8. The method in accordance with claim 1, wherein estimating the approximate surface geometry of the tip in a field-of-view region of the sample comprises predefining some reference positions at intersectional points of a surface of an arbitrary sphere and straight lines from an origin of the sphere to the detected positions, and optimizing those reference positions to new positions that form the field of view region.

9. The method in accordance with claim 8, wherein optimizing the reference positions comprises changing either a surface distance or a radius of the sphere by keeping the derived launch angles.

10. The method in accordance with claim 1, wherein measuring the actual surface geometry of the tip of the sample is done by using any of scanning probe microscopy, transmission electron microscopy, or ptychography.

11. The method in accordance with claim 1, wherein matching the approximate surface geometry to the actual surface geometry comprises using an iterative closest point method, in which the approximate surface geometry is pre-aligned to the actual surface geometry, and a weighting function is added for scaling a size of the surface geometry.

12. The method in accordance with claim 1, wherein the matching of the approximate surface geometry to the actual surface geometry comprises:
creating surface meshes,
coarse matching of the approximate surface geometry and the actual surface geometry to provide an initial guess of positions for alignment,
shifting and scaling data of the approximate surface geometry based on the initial guess, and
fine matching of the data of the approximate surface geometry to data of the actual surface geometry.

13. A system for determining a three-dimensional atomic distribution of a field of view region of a sample during an atom probe tomography process, comprising:
means for evaporating atoms from a sample and projecting them onto a detector,
the detector for recording a hit map comprising a hit location and a time of flight of each atom, and
a controller configured for carrying out the method of claim 1.

14. A computer program comprising instructions which, when the program is executed by a controller, causes the controller to carry out the steps of the method of claim 1.

15. A computer-readable storage medium having stored thereon the computer program of claim 14.

* * * * *